Jan. 15, 1935.  C. A. KIEL  1,988,385
FLEXIBLE METAL PIPE CONNECTION
Filed Sept. 9, 1933  2 Sheets-Sheet 1
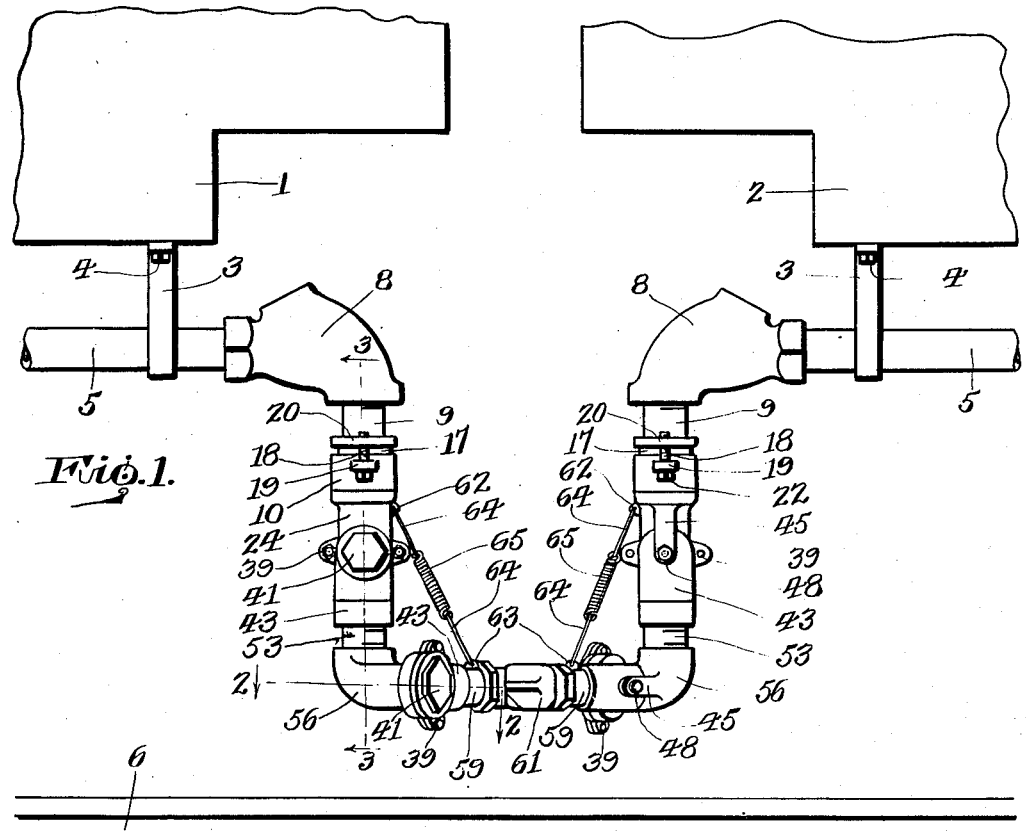
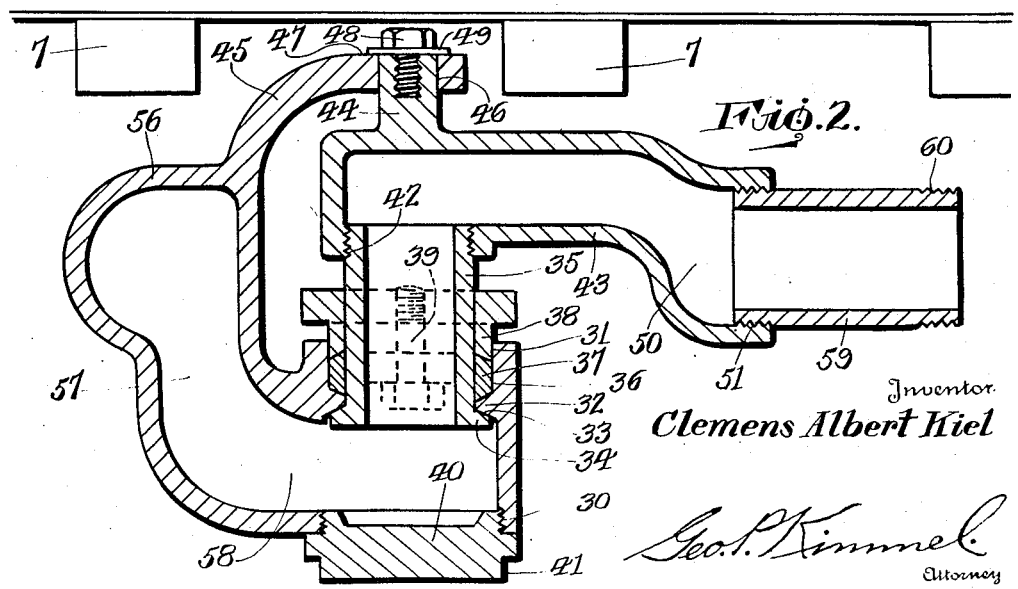
Inventor
Clemens Albert Kiel
Geo. P. Kimmel
Attorney

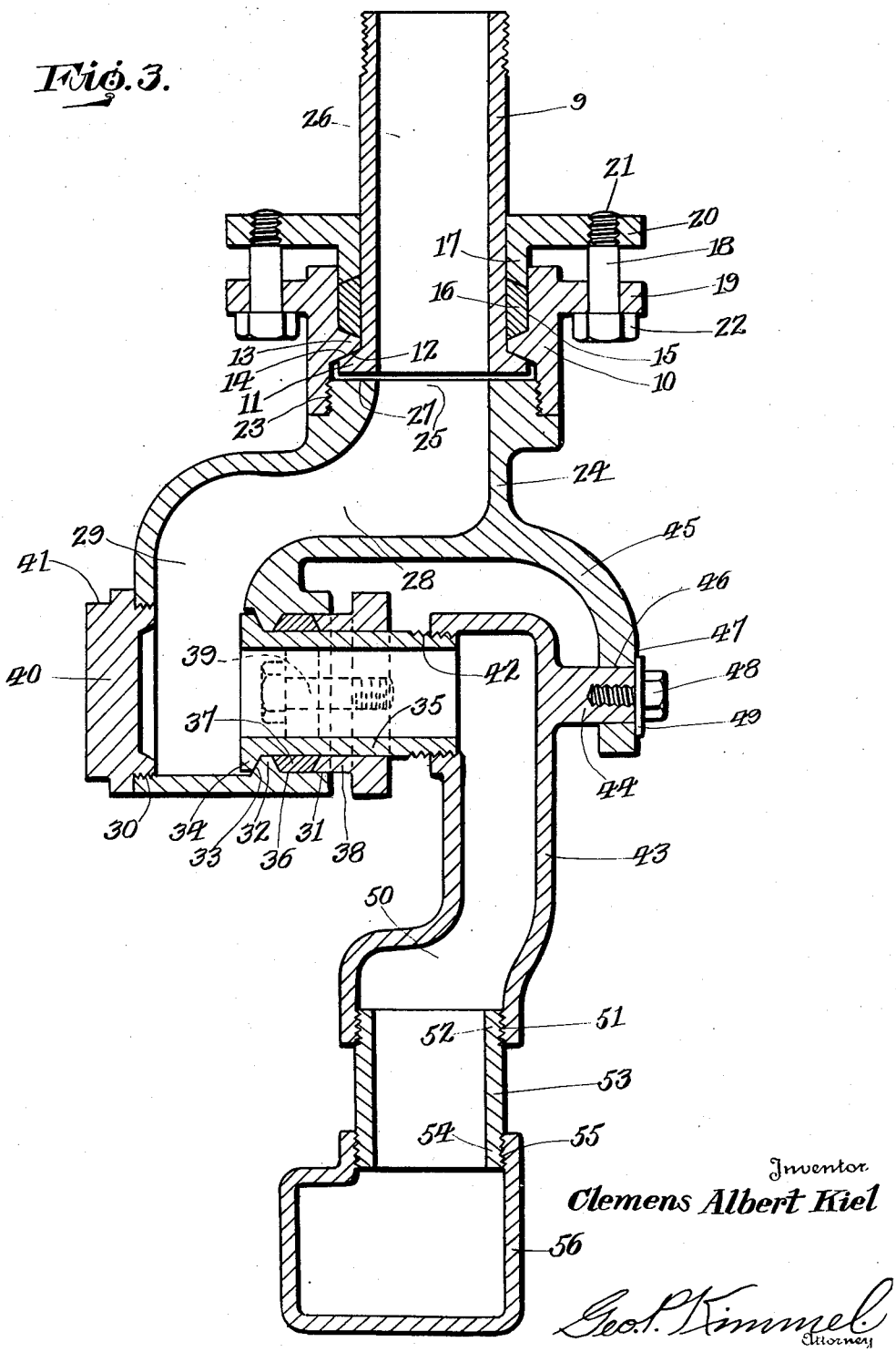

Patented Jan. 15, 1935

1,988,385

UNITED STATES PATENT OFFICE 1,988,385

FLEXIBLE METAL PIPE CONNECTION

Clemens Albert Kiel, Louisville, Ky., assignor of one-half to James V. Rowland, Louisville, Ky.

Application September 9, 1933, Serial No. 688,856

2 Claims. (Cl. 285—103)

This invention relates to a flexible metal pipe connection for coupling together the steam and other fluid lines or conduits of two adjacent railway or other vehicles of a train. Such a connection is particularly adapted for use in connection with the uniting of the steam lines between railway passenger cars.

Rubber hose connections have been largely used for coupling together the steam lines and other fluid lines such as above mentioned, but these have in a short period of time deteriorated to such an extent that they had to be replaced. Furthermore when so deteriorated they become dangerous to trainmen or other persons who happen to be in close proximity thereto.

Attempts have also been made to provide metal connections for lines of this sort, but great difficulty has been found in providing for such a connection the necessary flexibility to allow for movement between the cars during their use as well as to allow for necessary movement in coupling and uncoupling the cars.

It is therefore an object of this invention to provide a flexible pipe connection of the type set forth which may be formed of metal or other substantially rigid material, and to provide the same with sufficient flexible yet durable and satisfactory joints for the purpose of allowing the movement above referred to.

Other objects and advantages will be apparent from the following description taken in connection with the accompanying drawings in which one embodiment of this invention is set forth by way of illustration and example.

In these drawings:

Figure 1 is an elevation of two complete units illustrating the manner in which it is utilized for coupling together the fluid lines of two adjacent cars.

Figure 2 is a sectional view taken along the line 2—2 of Figure 1.

Figure 3 is a sectional view taken along the line 3—3 of Figure 1.

Referring now more particularly to the drawings numerals 1 and 2 indicate the respective ends of a pair of railway vehicles. To the lower side of each of these vehicles is secured a stirrup or other supporting member 3 by means of bolts 4 or the like. These stirrups 3, of which any desired number may be supplied are adapted to support the steam mains 5 customarily provided for cars of this type.

The cars 1 and 2 are adapted to be operated in the customary manner upon the rails 6 mounted on crossties 7, or they may be adapted for operation on any other type of road which may be found desirable.

The ends of the steam mains 5 are each provided with valve fittings 8 which may be of conventional construction whereby the ends of the mains may be closed when the main is uncoupled. Instead of the previously used hose connection, there is provided in accordance with this invention a connection formed of metal and consisting of the following:

Threaded into the outlet of the valve 8 on each car is a downwardly extending nipple 9 forming the male portion or male fitting of a flexible joint. This male fitting is adapted to fit within the female fitting 10, and is provided at its inner end with an outwardly extending flange 11 having an inclined or conical seat 12 thereon. The female fitting 10 is provided with an inwardly extending flange 13 having a bearing seat 14 thereon adapted to receive the seat 12 on the flange 11. The male fitting extends into the female fitting past the inwardly extending flange so that the pressure of fluid within the connection will tend to force the outwardly extending flange 11 against the bearing seat 14. The female member is provided with a packing box 15 adapted to receive the packing 16 for the purpose of preventing leakage through the joint between the male and female members. The packing 16 is held in place by means of the gland 17 which is in turn secured to the female fitting by means of bolts 18 passing through ears 19 on the female fitting and threadedly engaging ears 20 on the gland as illustrated at 21. The bolts 18 are provided with hexagonal or other suitable heads 22 so that they may be tightened up to compress the packing 16 by any desired amount.

The end of the female fitting 10 which is opposite the gland 17 is provided with an opening of sufficient size to admit the outwardly extending flange 11 on the male member, and is internally threaded at 23 to receive the upper end of a casting 24. The upper end of this casting is provided with an opening 25 which is of substantially the same size as the opening 26 through the male fitting 9. This leaves a shoulder 27 which is disposed closely adjacent the outwardly extending flange 11 when the parts are assembled as illustrated in Figure 3 whereby the flange 11 is held in close relation with respect to the bearing seat 14 even when there is no fluid pressure within the connection.

The casting 24 forms the female portion of a second flexible joint as will now be described. This fitting is provided with a laterally extending portion 28 and a downwardly extending portion 29, the downwardly extending portion 29 terminating in a pair of aligned lateral openings 30 and 31. The axis of the openings 30 and 31 is substantially parallel to the axis of the laterally extending portion 28, and is normally substantially horizontal. The opening 31 forms the female portion of this second joint and is provided with an inwardly extending flange 32 corresponding to the flange 13 within the fitting 10. This flange 32 provides a bearing seat 33 adapted to receive the outwardly extending flange 34 upon the male fitting 35. This male fitting 35 extends into the female fitting through the opening 31 past the bearing seat 33 so that the pressure of angles to the intake opening of the fitting 24. The fitting 56 is provided with a laterally extending portion 57 similar to the portion 28 and with a portion 58 at substantially right angles thereto and corresponding to the portion 29. The other parts of this fitting and the connections thereto are identical in construction with those above described, and have been given corresponding reference numerals on the drawings. The fitting 43 illustrated in Figure 2 is provided at its free end with a nipple 59 which is threaded at 60 to receive a coupling member 61 of conventional construction. The coupling member 61 on each flexible connection is identical, and these members are so formed that two of them will fit together to provide a tight joint.

As illustrated in Figure 1, the fitting 24 is lug on said elbow in alignment with the interengaging parts of said male and female members, a projection on said female member forming a bearing for rotatably supporting said lug, whereby said male and female members will be positively maintained in proper alignment with each other and means on said lug engaging the outer surface of said projection to draw and hold the outwardly projected flange on the male member in close relationship with respect to said bearing seat when the fluid in the connection is not under pressure.

2. In a flexible pipe coupling, a female member having an offset portion provided with a transverse opening and also having an oppositely offset projecting arm having an aperture axially alined with the said opening, the wall of said opening having an inwardly projecting annular flange bevelled on its inner and outer faces, a male member having one end extending into said opening and provided with an external bevelled annular flange, the bevelled face of which abuts the inner bevelled face of said inwardly projecting flange, packing against the outer face of said inwardly projecting flange, a gland around the male member abutting said packing, an elbow threaded in connection with the other end of said male member and having a cylindrical lug projecting therefrom within the said aperture of said arm, and a screw threaded into the outer end of said lug, and abutting the said arm to draw the end flange of the male member snugly against the said inner flange of the female member to insure against leakage when the fluid in the connection is not under pressure.

CLEMENS ALBERT KIEL.